US009546721B2

(12) United States Patent
Mittelberger et al.

(10) Patent No.: US 9,546,721 B2
(45) Date of Patent: Jan. 17, 2017

(54) TRANSMISSION FOR VEHICLE AND METHOD FOR OPERATION OF A TRANSMISSION

(71) Applicant: ZF Friedrichshafen AG, Friedrichshafen (DE)

(72) Inventors: Christian Mittelberger, Ravensburg (DE); Stefan Blattner, Vogt (DE); Bernard Hunold, Friedrichshafen (DE); Eckhardt Lubke, Friedrichshafen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 173 days.

(21) Appl. No.: 14/525,304

(22) Filed: Oct. 28, 2014

(65) Prior Publication Data

US 2015/0126321 A1 May 7, 2015

(30) Foreign Application Priority Data

Nov. 6, 2013 (DE) ........................ 10 2013 222 510

(51) Int. Cl.
*F16H 37/04* (2006.01)
*F16H 61/688* (2006.01)
(Continued)

(52) U.S. Cl.
CPC .......... *F16H 37/042* (2013.01); *F16H 37/046* (2013.01); *F16H 61/688* (2013.01);
(Continued)

(58) Field of Classification Search
None
See application file for complete search history.

(56) References Cited

U.S. PATENT DOCUMENTS 7,914,412 B2 3/2011 Gitt
8,485,055 B2 7/2013 Gumpoltsbeger et al.
(Continued)

FOREIGN PATENT DOCUMENTS

DE 10 2005 033 027 A1 1/2007
DE 10 2006 054 281 A1 6/2008
(Continued)

OTHER PUBLICATIONS

German Search Report issued in German Application No. 10 2013 222 510.5 mailed Apr. 17, 2015.

*Primary Examiner* — Justin Holmes
(74) *Attorney, Agent, or Firm* — Davis & Bujold, PLLC; Michael J. Bujold

(57) ABSTRACT

A method of operating dual-clutch transmission for a vehicle which has two partial transmissions, each partial transmission having an input shaft arranged on an input shaft axis. An output shaft is arranged on the input shaft axis or a parallel countershaft axis. An intermediate gear system on the countershaft axis. At least one input shaft can be connected to the drive output shaft, as a direct drive, and only one countershaft is arranged on the countershaft axis and supports only fixed gears. One of the gears is a direct gear so that, when the direct gear is engaged, all the shifting elements, for coupling the intermediate gear system via the gear planes into the force flow, can be disengaged. Each gear plane can be coupled by a shifting element arranged on the input shaft axis to a shaft, and the gear next-lower than the direct gear is a coupling gear.

24 Claims, 14 Drawing Sheets

(51) Int. Cl.
*F16H 3/00* (2006.01)
*F16H 61/70* (2006.01)

(52) U.S. Cl.
CPC ............ *F16H 3/006* (2013.01); *F16H 61/702* (2013.01); *F16H 2200/0073* (2013.01); *F16H 2200/0078* (2013.01); *F16H 2200/0091* (2013.01); *F16H 2200/0095* (2013.01); *Y10T 74/19233* (2015.01)

(56) References Cited

U.S. PATENT DOCUMENTS

| | | | | |
|---|---|---|---|---|
| 2008/0134834 | A1 | 6/2008 | Gitt et al. | |
| 2009/0266190 | A1* | 10/2009 | Dittrich | F16H 3/095 74/331 |
| 2012/0132022 | A1* | 5/2012 | Fronius | F16D 25/123 74/331 |
| 2013/0288850 | A1 | 10/2013 | Kaltenbach | |

FOREIGN PATENT DOCUMENTS

| | | | |
|---|---|---|---|
| DE | 10 2010 030 569 | A1 | 12/2011 |
| DE | 10 2012 217 503 | A1 | 3/2014 |
| EP | 2002146 | B1 | 12/2008 |

* cited by examiner

| Gear | K1 | K2 | S1 | S2 | S3 | S5 | V | R' | L | H | i | φ |
|---|---|---|---|---|---|---|---|---|---|---|---|---|
| V1 | | ● | ● | | | | ● | | ● | | 16.370 | |
| V2 | ● | | | ● | | | ● | | ● | | 12,434 | 1,317 |
| V3 | | ● | | | ● | | ● | | ● | | 9,378 | 1,326 |
| V4 | | ● | ● | ● | | ● | | | ● | | 7,022 | 1,336 |
| V5 | ● | | | | | ● | | | ● | | 5,333 | 1,317 |
| V6 | | ● | | ● | ● | ● | | | ● | | 4,023 | 1,326 |
| V7 | | ● | ● | | | | ● | | | ● | 3,069 | 1,311 |
| V8 | ● | | | ● | | | ● | | | ● | 2,331 | 1,317 |
| V9 | | ● | | | ● | | ● | | | ● | 1,758 | 1,326 |
| V10 | | ● | ● | ● | | ● | | | | ● | 1,317 | 1,336 |
| V11 | ● | | | | | ● | | | | ● | 1,000 | 1,317 |
| V12 | | ● | | ● | ● | ● | | | | ● | 0,754 | 1,326 |
| R1 | | ● | ● | | | | | ● | ● | | 17,080 | |
| R2 | ● | | | ● | | | | ● | ● | | 12,912 | 1,316576 |
| R3 | | ● | | | ● | | | ● | ● | | 9,739 | 1,325815 |
| R4 | | ● | ● | | | | | ● | | ● | 3,188 | |
| R5 | ● | | | ● | | | | ● | | ● | 2,421 | 1,316576 |
| R6 | | ● | | | ● | | | ● | | ● | 1,826 | 1,325815 |

Fig. 3

| Gear | Traction force interrupted | Powershift | Supported gearshift |
|---|---|---|---|
| 1 → 2 | | X | |
| 2 → 3 | | X | |
| 3 → 4 | X | | |
| 3 → 5 → 4 | | | X |
| 4 → 5 | | X | |
| 5 → 6 | | X | |
| 1 → 3 | X | | |
| 2 → 4 | X | | |
| 3 → 5 | | X | |
| 4 → 6 | X | | |
| 6 to 12 analogously | | | |

Fig. 4

| Gear | K1 | K2 | A | B | C | D | E | F | G | L | H | i | φ |
|---|---|---|---|---|---|---|---|---|---|---|---|---|---|
| V1 | ● | | | | ● | | | ● | | ● | | 17,33 | |
| V2 | | ● | ● | | | | | ● | | ● | | 13,03 | 1,33 |
| V3 | ● | | | | | ● | | ● | | ● | | 9,80 | 1,33 |
| V4 | | ● | | ● | | | | ● | | ● | | 7,36 | 1,33 |
| V5 | ● | | | | | | ● | | | ● | | 5,54 | 1,33 |
| V6 | | ● | | ● | | ● | ● | | | ● | | 4,16 | 1,33 |
| V7 | ● | | | | ● | | | ● | | | ● | 3,13 | 1,33 |
| V8 | | ● | ● | | | | | ● | | | ● | 2,35 | 1,33 |
| V9 | ● | | | | | ● | | ● | | | ● | 1,77 | 1,33 |
| V10 | | ● | | ● | | | | ● | | | ● | 1,33 | 1,33 |
| V11 | ● | | | | | | ● | | | | ● | 1,00 | 1,33 |
| V12 | | ● | | ● | | ● | ● | | | | ● | 0,75 | 1,33 |
| R1 | ● | | | | ● | | | | ● | ● | | -17,33 | |
| R2 | | ● | ● | | | | | | ● | ● | | -13,03 | 1,33 |
| R3 | ● | | | | | ● | | | ● | ● | | -9,80 | 1,33 |
| R4 | | ● | | ● | | | | | ● | ● | | -7,36 | 1,33 |

PRIOR ART Fig. 6

| Gear | K1 | K2 | A | B | C | D | E | F | G | L | H | i | φ |
|---|---|---|---|---|---|---|---|---|---|---|---|---|---|
| V1 | ● | | | | ● | | | ● | | ● | | 17,62 | |
| V2 | | ● | ● | | | | | ● | | ● | | 13,88 | 1,27 |
| V3 | ● | | | | | ● | | ● | | ● | | 10,93 | 1,27 |
| V4 | | ● | | ● | | | | ● | | ● | | 8,60 | 1,27 |
| V5 | | ● | ● | | | ● | ● | | | ● | | 6,77 | 1,27 |
| V6 | ● | | | | | | ● | | | ● | | 5,33 | 1,27 |
| V7 | | ● | | ● | | ● | ● | | | ● | | 4,20 | 1,27 |
| V8 | ● | | | | ● | | | ● | | | ● | 3,31 | 1,27 |
| V9 | | ● | ● | | | | | ● | | | ● | 2,60 | 1,27 |
| V10 | ● | | | | | ● | | ● | | | ● | 2,05 | 1,27 |
| V11 | | ● | | ● | | | | ● | | | ● | 1,61 | 1,27 |
| V12 | | ● | ● | | | ● | ● | | | | ● | 1,27 | 1,27 |
| V13 | ● | | | | | | ● | | | | ● | 1,00 | 1,27 |
| V14 | | ● | | ● | | ● | ● | | | | ● | 0,79 | 1,27 |
| R1 | ● | | | | ● | | | | ● | ● | | -17,62 | |
| R2 | | ● | ● | | | | | | ● | ● | | -13,88 | 1,27 |
| R3 | ● | | | | | ● | | | ● | ● | | -10,93 | 1,27 |
| R4 | | ● | | ● | | | | | ● | ● | | -8,60 | 1,27 |

Fig. 7

| Gear | K1 | K2 | A | B | C | D | E | F | G | J | L | H | i | φ |
|---|---|---|---|---|---|---|---|---|---|---|---|---|---|---|
| V1 | ● | | | | ● | | | | ● | | ● | | 15.92 | |
| V2 | | ● | ● | | | | | | ● | | ● | | 11.70 | 1.36 |
| V3 | ● | | | | | ● | | | ● | | ● | | 8.61 | 1.36 |
| V4 | | ● | | ● | | | | | ● | | ● | | 6.33 | 1.36 |
| V5 | ● | | | | | | ● | | | | ● | | 4,65 | 1.36 |
| V6 | ● | | | | ● | | | | | ● | | | 3,42 | 1.36 |
| V7 | | ● | ● | | | | | | | ● | | | 2.52 | 1.36 |
| V8 | ● | | | | | ● | | | | ● | | | 1.85 | 1.36 |
| V9 | | ● | | ● | | | | | | ● | | | 1.36 | 1.36 |
| V10 | ● | | | | | | ● | | | | | ● | 1.00 | 1.36 |
| V11 | | ● | | ● | | ● | ● | | | | | ● | 0.74 | 1.36 |
| R1 | ● | | | | ● | | | ● | | | ● | | -15.92 | |
| R2 | | ● | ● | | | | | ● | | | ● | | -11.70 | 1.36 |
| R3 | ● | | | | | ● | | ● | | | ● | | -8.61 | 1.36 |
| R4 | | ● | | ● | | | | ● | | | ● | | -6.33 | 1.36 |

PRIOR ART

Fig. 8b

| Gear | K1 | K2 | A | B | C | D | E | F | G | J | L | H | i | φ |
|---|---|---|---|---|---|---|---|---|---|---|---|---|---|---|
| V1 | ● | | | | ● | | | | ● | | ● | | 18,17 | |
| V2 | | ● | ● | | | | | | ● | | ● | | 13,96 | 1,30 |
| V3 | ● | | | | | ● | | | ● | | ● | | 10,72 | 1,30 |
| V4 | | ● | | ● | | | | | ● | | ● | | 8,24 | 1,30 |
| V5 | | ● | ● | | | ● | ● | | | | ● | | 6,33 | 1,30 |
| V6 | ● | | | | | | ● | | | | ● | | 4,86 | 1,30 |
| V7 | ● | | | | ● | | | | | ● | | | 3,74 | 1,30 |
| V8 | | ● | ● | | | | | | | ● | | | 2,87 | 1,30 |
| V9 | ● | | | | | ● | | | | ● | | | 2,20 | 1,30 |
| V10 | | ● | | ● | | | | | | ● | | | 1,69 | 1,30 |
| V11 | | ● | ● | | | ● | ● | | | | | ● | 1,30 | 1,30 |
| V12 | ● | | | | | | ● | | | | | ● | 1,00 | 1,30 |
| V13 | | ● | | ● | | ● | ● | | | | | ● | 0,77 | 1,30 |
| R1 | ● | | | | ● | | | ● | | ● | ● | | -18,17 | |
| R2 | | ● | ● | | | | | ● | | ● | ● | | -13,96 | 1,30 |
| R3 | ● | | | | | ● | | ● | | ● | ● | | -10,72 | 1,30 |
| R4 | | ● | | ● | | | | ● | | ● | ● | | -8,24 | 1,30 |

Fig. 9

| Gear | K1 | K2 | A | B | C | D | E | F | G | J | L | H | i | φ |
|---|---|---|---|---|---|---|---|---|---|---|---|---|---|---|
| V1 | | ● | ● | | | | | | ● | | ● | | 15,92 | |
| V2 | ● | | | | | ● | | | ● | | ● | | 11,70 | 1,36 |
| V3 | | ● | | ● | | | | | ● | | ● | | 8,61 | 1,36 |
| V4 | | ● | ● | | | ● | ● | | | | ● | | 6,33 | 1,36 |
| V5 | ● | | | | | | ● | | | | ● | | 4,65 | 1,36 |
| V6 | | ● | ● | | | | | | | ● | | | 3,42 | 1,36 |
| V7 | ● | | | | | ● | | | | ● | | | 2,52 | 1,36 |
| V8 | | ● | | ● | | | | | | ● | | | 1,85 | 1,36 |
| V9 | | ● | ● | | | ● | ● | | | | | ● | 1,36 | 1,36 |
| V10 | ● | | | | | | ● | | | | | ● | 1,00 | 1,36 |
| V11 | | ● | | ● | | ● | ● | | | | | ● | 0,74 | 1,36 |
| R1 | | ● | ● | | | | | ● | | ● | ● | | -15,92 | |
| R2 | ● | | | | | ● | | ● | | ● | ● | | -11,70 | 1,36 |
| R3 | | ● | | ● | | | | ● | | ● | ● | | -8,61 | 1,36 |

Fig. 12

TRANSMISSION FOR VEHICLE AND METHOD FOR OPERATION OF A TRANSMISSION

This application claims priority from German patent application serial no. 10 2013 222 510.5 filed Nov. 6, 2013.

FIELD OF THE INVENTION

The invention concerns a method for operating a transmission, in particular a dual-clutch transmission for a motor vehicle, which comprises at least two partial transmissions each of which has at least one input shaft on a drive input side of the transmission, which input shafts are arranged on an input shaft axis, an output shaft as the drive output shaft of the at least two partial transmissions on a drive output side of the transmission, the drive output shaft being arranged on the input shaft axis or on at least one countershaft axis, in particular one that is parallel to the input shaft axis, an intermediate gear system on the at least one countershaft axis, having at least one countershaft, wherein at least one of the input shafts can be connected by way of at least one wheel plane and/or at least one shifting element to the drive output shaft, wherein at least four wheel planes for obtaining the forward gears and at least six shifting elements are provided, and wherein on the at least one countershaft axis only one respective countershaft is arranged, which has only transmission elements in the sense of fixed wheels for the respective one countershaft concerned, such that by means of the transmission at least a plurality of forward gears and/or reverse gears in a transmission ratio series can be obtained and such that at least one of the gears that can be obtained by means of the transmission is designed as a direct gear.

The invention also concerns a transmission, in particular a dual-clutch transmission for a motor vehicle, which comprises at least two partial transmissions each of which has at least one input shaft on a drive input side of the transmission, which input shafts are arranged on an input shaft axis, an output shaft as the drive output shaft of the at least two partial transmissions on a drive output side of the transmission, the drive output shaft being arranged on the input shaft axis or on at least one countershaft axis, in particular one that is parallel to the input shaft axis, an intermediate gear system on the at least one countershaft axis, having at least one countershaft, wherein at least one of the input shafts can be connected by way of at least one wheel plane and/or at least one shifting element to the drive output shaft, wherein at least four wheel planes for obtaining the forward gears and at least six shifting elements are provided, and wherein on the at least one countershaft axis only one respective countershaft is arranged, which has only transmission elements in the sense of fixed wheels for the respective one countershaft concerned, such that by means of the transmission at least a plurality of forward gears and/or reverse gears in a transmission ratio series can be obtained and such that at least one of the gears that can be obtained by means of the transmission is designed as a direct gear.

In addition the invention concerns a motor vehicle, in particular a passenger car or a truck, with a transmission.

BACKGROUND OF THE INVENTION

Such transmissions for a motor vehicle are configured inter alia as so-termed dual-clutch transmissions, in which the input shafts of the two partial transmissions can be connected by an associated powershift element to a drive input such as an internal combustion engine or an electric motor, wherein the two powershift elements are then combined by means of a dual clutch. The gear steps that can be obtained with such a transmission are distributed in alternation between the two partial transmissions, so that for example one partial transmission produces the odd-numbered gears and the corresponding other partial transmission produces the even-numbered gears. It is also known to obtain the individual gears by means of one or more gear steps or planes each of which have different transmission ratios. By means of corresponding shifting elements these can be connected into the force flow between the drive input and the drive output, so that a corresponding desired transmission ratio between the drive input and the drive output is obtained in each case.

By alternately allocating the gears between the two partial transmissions it is possible, when driving in a gear associated with one of the partial transmissions, to preselect a subsequent gear in the respective other partial transmission by appropriate actuation of the shifting devices, so that an eventual change to the subsequent gear is enabled by opening the powershift element of the one partial transmission and shortly thereafter closing the powershift element of the other partial transmission. In this way the gears or gear steps of the transmission can be powershifted, which improves the acceleration ability of the motor vehicle since the gearshift takes place essentially without traction force interruption and also makes the shifting process more comfortable for the driver.

Such dual-clutch transmissions can also be made with a drive input and drive output intermediate gear system arranged additionally, so that in the axial direction a more compact structure is produced.

From DE 10 2006 054 281 A1 a transmission of that type for a motor vehicle, in the form of a dual-clutch transmission, is known. In this case the dual-clutch transmission comprises two partial transmissions, each with an input shaft. By connecting the respective input shaft by means of an associated powershift element, the two partial transmissions can in each case be connected in alternation into a force or torque flow from a drive input to a drive output, the input shaft of the first partial transmission being designed as a central shaft of the transmission whereas the input shaft of the second partial transmission is designed as a hollow transmission shaft. Furthermore a drive output shaft is provided, which is designed as the drive output of the two partial transmissions, so that rotation of the drive input can be transmitted by way of a plurality of transmission ratio stages to the drive output, in which transmission the force and torque flow passes via an intermediate gear system. In this case at least two wheel planes are engaged in the force and torque flow by actuating associated shifting elements, and by combining shifting element actuation and the force and torque flow a plurality of gear steps can be obtained by way of corresponding wheel planes. Likewise, non-geared transmission of the rotational movement of the drive input to an output shaft of the drive output can be obtained by actuating appropriate shifting elements.

Further, DE 10 2005 033 027 A1 shows a powershifting dual-clutch transmission for commercial vehicles.

In addition, DE 10 2012 217 503 describes a dual-clutch transmission with twelve gears, including an overdrive gear, the transmission being fully powershiftable. In this case only the highest gear, i.e. the eleventh gear, is used as the overdrive gear. The fifth gear, which is a direct gear, and the sixth gear are in the same partial transmission and shifting from gear five to gear six is carried out as a supported gearshift with the seventh gear as the supporting gear.

Moreover, the applicant knows of a dual-clutch transmission with a range group of planetary design. In this case, two partial transmissions are each connected to a respective input shaft and the output side of each partial transmission is connected to the input shaft of the range group. The second partial transmission comprises two gears with the first two gear planes and the first two shifting elements, whereas the first partial transmission has three gears with the third and fourth gear planes and the direct gear and shifting elements Nos. 3 to 5. The fifth and sixth gear planes serve in this case as drive output constants for forward and reverse with the shifting elements Nos. 6 and 7. The direct gear is the fifth gear in the main transmission. In the sixth gear and the twelfth gear (overdrive gear) the two partial transmissions are coupled. In the coupling gear one of the drive input gear planes Nos. 3 or 4 of the first partial transmission is used as the drive output gear plane for the second partial transmission. The drive output leads on via the shifting element for the direct gear, i.e. the fifth shifting element; thus, the first partial transmission is 'forced' in the direct gear. A next-higher gear cannot therefore be powershifted. Furthermore, when changing from the sixth to the seventh gear the traction-force-interrupted range group is shifted and accordingly a shift from the sixth to the seventh gear can only take place with traction force interruption.

This has the disadvantage that the structural complexity of the transmission is relatively great for the number of powershiftable gears that can be obtained.

SUMMARY OF THE INVENTION

An objective of the present invention, therefore, is to provide a method for operating a transmission and a transmission that entail little structural complexity and with which as many powershiftable gears as possible can be obtained. In addition, an objective of the present invention is to provide a method for operating a transmission and a transmission, such that the structure of the transmission is simple and hence inexpensive and the transmission can be operated simply and thus inexpensively. Finally, an objective of the present invention is to indicate an alternative transmission and an alternative method for operating a transmission.

The present invention achieves its objectives with a method for operating a transmission, in particular a dual-clutch transmission for a motor vehicle, which comprises at least two partial transmissions, wherein each of the partial transmissions has at least one input shaft on a drive input side of the transmission, which are arranged on an input shaft axis, an output shaft as the drive output shaft of the at least two partial transmissions on a drive output side of the transmission, wherein the drive output shaft is arranged on the input shaft axis or on at least one countershaft axis, in particular one that is parallel to the input shaft axis, an intermediate gear system on the at least one countershaft axis with at least one countershaft, wherein at least one of the input shafts can be connected to the drive output shaft by means of at least one gear plane and/or at least one shifting element, wherein at least four gear planes for producing the forward gears and at least six shifting elements are provided, and wherein on the at least one countershaft axis, in each case, only one countershaft is arranged, which only has transmission elements in the sense of fixed wheels for the respective one countershaft concerned, such that by means of the transmission at least a plurality of forward gears and/or reverse gears can be obtained, and such that at least one of the gears that can be obtained with the transmission is designed as a direct gear, in that when the direct gear is engaged all the shifting elements for coupling the intermediate gear system via the gear planes into the force flow can be disengaged, and wherein each gear plane can be coupled to a shaft by a shifting element arranged on the input shaft axis and the gear next-lower that the direct gear is designed as a coupling gear.

The present invention also achieves its objectives with a transmission, in particular a dual-clutch transmission for a motor vehicle, which comprises at least two partial transmissions, each of the partial transmissions comprising at least one input shaft on a drive input side of the transmission, which are arranged on an input shaft axis, an output shaft as the drive output shaft of the at least two partial transmissions on an output side of the transmission, wherein the drive output shaft is arranged on the input shaft axis or on at least one countershaft axis, in particular one that is parallel to the input shaft axis, an intermediate gear system on the at least one countershaft axis, having at least one countershaft, wherein at least one of the input shafts can be connected by way of at least one gear plane and/or at least one shifting element to the drive output shaft, wherein at least six shifting elements are provided, and wherein on the at least one countershaft axis, in each case, only one countershaft is arranged, which has only transmission elements in the sense of fixed wheels for the respective one countershaft concerned, such that by means of the transmission at least a plurality of forward gears and/or reverse gears can be obtained, and wherein at least one of the gears that can be obtained by means of the transmission is in the form of a direct gear, in that only four gear planes for obtaining the forward gears are provided, and by means of the four gear planes and the six shifting elements at least 6 forward gears can be obtained, and the transmission is designed such that at least all of the gearshifts between adjacent gears can be powershifted.

The present invention also achieves its objectives with a motor vehicle, in particular a passenger car or a truck, having a transmission according to the invention.

One of the advantages achieved is that in this way the structural complexity of the transmission is reduced. A further advantage is that more powershiftable gears can be made available.

Alternatively to the possibility of disengaging all the shifting elements to couple the intermediate gear system into the force flow during operation in the direct gear, a countershaft can also be driven by means of a engaged shifting element and a gear plane, for example in order to drive an auxiliary aggregate such as an oil pump if the auxiliary aggregate is powered by the countershaft.

A coupling gear is understood to mean a gear in which at least one of the input shafts is connected to the drive output shaft by way of at least one of the countershafts. As a rule the force flow in a coupling gear passes from one of the input shafts via a gear plane to one of the countershafts, and via another gear plane to the drive output shaft. A gear plane comprises for example two straight-toothed or helically-toothed bevel gears that mesh with one another, one of them being a fixed wheel and the other a loose wheel arranged on the respectively associated shaft.

The main group is understood to mean that section or part of a transmission which does not comprise a range group.

By way of the drive input shaft of the transmission, particularly preferably torque or rotational movement of a driveshaft, for example the driveshaft of an internal combustion engine, is introduced into the transmission. In a preferred manner, between the drive input shaft and the drive output shaft there is a starting element, for example a hydrodynamic torque converter or a fluid coupling.

In what follows, a shaft is understood to mean not exclusively—for example—a cylindrical machine element that is mounted to rotate, but rather, the terms is applied to connection elements in general that connect individual components or elements to one another, in particular connecting elements which connect a plurality of elements to one another in a rotationally fixed manner.

Two elements are in particular said to be connected to one another when a fixed, in particular rotationally fixed connection exists between them. In particular, such connected elements rotate at the same speed.

In what follows, two elements are said to be able to be coupled or connected to one another if a detachable connection exists between them. In particular, the elements rotate at the same speed when the connection has been formed.

The various components and elements of the invention can be connected with one another by way of a shaft or a connecting element, but also directly, for example by means of a weld joint, a press fit or some other connection means.

In this description and especially in the claims, a clutch is understood to be a shifting element which, depending on its actuation condition, allows a relative movement between two components or which forms a torque-transmitting connection between them. A relative movement is understood to mean for example a rotation of two components such that the rotational speed of the first component and the rotational speed of the second component are different. Moreover, it is also conceivable that only one of the two components is rotating while the other component is at rest, or is rotating in the opposite direction.

In what follows, a non-actuated clutch is understood to be a disengaged clutch. This means that relative movement between the two components is possible. Correspondingly, with an actuated or engaged clutch the two components rotate at the same speed and in the same direction.

Basically shifting elements can also be used, which are engaged when not actuated and disengaged when actuated. Correspondingly, the association between the function and shifting condition of the shifting conditions described above is to be understood in the converse sense. In the example embodiments described below with reference to the figures, to begin with an arrangement is assumed in which an actuated shifting element is engaged and a non-actuated shifting element is disengaged.

A planetary gearset or planetary transmission comprises a sun gear, a planetary gear carrier or web, and a ring gear. Mounted to rotate on the planetary carrier or web are planetary gearwheels or planetaries, which mesh with the teeth of the sun gear and/or with the teeth of the ring gear.

Furthermore, the shifting elements can be designed in such manner that energy is needed in order to change a shifting condition of the shifting element, but not in order to maintain the shifting condition itself.

Particularly suitable for this are shifting elements that can be actuated as necessary, such as electro-mechanical shifting elements or electromagnetic shifting elements. Compared with conventional, hydraulically actuated shifting elements these are characterized by particularly low and efficient energy demand, since they can be operated virtually without losses. Moreover, in an advantageous manner there is no need to continually maintain a control pressure for actuating the for example conventional hydraulic shifting elements or to continually act upon the shifting element concerned in its engaged condition with the necessary hydraulic pressure. Because of this, for example further components such as hydraulic pumps can be omitted provided that they serve exclusively for the control and supply of the conventional, hydraulically actuated shifting elements. If other components are supplied with lubricants not by a separate lubricant pump but by the same hydraulic pump, then the latter can at least be made smaller. Any leaks that occur at oil transfer points of the hydraulic circuit, in particular at rotating components, are avoided. Particularly preferably, this also contributes toward increasing the efficacy of the transmission by virtue of a higher efficiency.

When shifting elements of the above type that can be actuated as necessary are used, it is particularly advantageous for these to be easily accessible from the outside. Among other things this has the advantage that the necessary shifting energy can be supplied efficiently to the shifting elements. Accordingly, shifting elements are particularly preferred which are arranged so as to be easily accessed from outside. In the context of shifting elements, 'easily accessed from outside' means that no other components are arranged between the housing of the transmission and the shifting element, or that the shifting elements are particularly preferably arranged on the drive input shaft or on the drive output shaft.

The term "connectability", preferably in the description and in particular in the claims, is understood to mean that in different geometric positions the same connection or attachment of interfaces is ensured without cross-over of individual connecting elements or shafts.

Further advantageous embodiments, features and advantages of the invention are described below.

In a first preferred embodiment of the method, the next-lower gear designed as a coupling gear and the next-lower gear before that coupling gear are associated with one of the at least two partial transmissions, while the direct gear is associated with another partial transmission.

Advantageously, the force flow from the drive input side to the drive output side takes place for the coupling gear from the input shaft axis, via the intermediate gear system and back to the input shaft axis, and thereafter analogously to the force flow of the direct gear. In this way a coupling gear is made available in a simple and reliable manner.

Expediently, the gears directly adjacent to one of the partial transmissions are engaged by means of a supported gearshift. In that way, traction force support while shifting between the two directly adjacent gears is made possible in a simple manner.

Advantageously, when shifting the two next gears before the direct gear, the direct gear is preselected. This enables a supported gearshift to be carried out simply.

Expediently, the traction force support for the supported gearshift takes place by way of the direct gear and the partial transmission with which the two next-lower gears before the direct gear are not associated. This enables particularly simple traction force support for the supported gearshift.

Advantageously, on the drive output shaft of the transmission there is arranged a planetary gearset, the drive output shaft then being designed to be the sun gear shaft of the planetary gearset and the planetary carrier shaft being the new drive output shaft of the transmission. By means of this planetary gearset, a range group can be added so that the number of forward and/or reverse gears obtainable with the transmission is increased.

Advantageously, the sun gear shaft is coupled with the ring gear shaft of the planetary gearset in order to provide a transmission ratio of 1. In this way, by means of the range group a transmission ratio of 1 can be provided in a simple manner.

Expediently, a direct powershift takes place from the next-but-one lower gear, starting from the direct gear, to the direct gear. This is desirable in particular when the vehicle is accelerating rapidly, since otherwise the gear interval to the next gear would sometimes be too small.

Expediently, the force flow from the drive input side to the drive output side in at least one gear takes place by way of an intermediate gearset having a countershaft on each of two countershaft axes. Thus, for each countershaft axis only one countershaft is provided. This enables a simple division of power.

Advantageously, by means of the transmission at least eleven forward gears, in particular between eleven and fourteen forward gears, and at least four reverse gears, in particular exactly four reverse gears can be obtained. In this way the transmission can be operated in the most varied vehicles by means of the method, since a sufficient number of forward and reverse gears can be obtained.

Advantageously, the gears of the transmission are geometrically stepped, In a simple manner this gives a series of transmission ratios with equal gear intervals so that in particular the coupling gear provides a single geometrical gear interval.

Expediently, the transmission is operated with six gear planes and seven shifting elements. The advantage is that the principle of its structure is already known so that the transmission can be manufactured simply.

Advantageously, in a transmission according to the invention, one gear plane is designed as a reversing gear step which, in particular, is that gear plane of all the gear planes which is nearest to the drive output side. In this way at least one reverse gear can be obtained with the transmission. If in addition the reversing gear step is the gear plane nearest to the drive output side, then the force and torque can be transmitted from the intermediate gear system directly to the drive output shaft for the at least one reverse gear.

Expediently, more gear planes are and/or can be connected to the input shafts than to the drive output shaft. This enables the area of the drive output shaft to be designed compactly.

Advantageously, on the drive output side of the transmission there is arranged a planetary gearset, the drive output shaft now forming the sun gear shaft of the planetary gearset and the planetary carrier shaft forming the new drive output shaft of the transmission. In this way a range group can be provided in a simple manner, with which further forward and/or reverse gears can be obtained with the transmission.

Expediently, on at least one transmission element of a gear plane and/or on at least one countershaft and/or on at least one of the shafts on the input shaft axis, in order to hybridize the transmission an electric machine is arranged in particular by way of an additional shifting element and/or a transmission element connected thereto.

One of the advantages so achieved is that the transmission can also be used in hybrid vehicles, in which both an electric machine and also an internal combustion engine are intended to co-operate with the transmission to transmit forces for propelling the hybrid vehicle. In this case the at least one electric machine can be connected to at least one of the shafts on the input shaft axis and/or the countershaft axis. The electric machine can likewise be connected to a transmission element in the form of a fixed wheel or loose wheel of one of the gear planes.

It is also possible to connect the electric machine to an additional fixed wheel, i.e. to a wheel that is connected to one of the shafts of the transmission. In that case it is particularly advantageous to connect the electric machine to the transmission by means of at least one shifting element, in particular to a transmission element of a gear plane. The advantage achieved with this first connection possibility is that thereby it enables a so-termed continuous charging capability and electrical driving without drag losses in the transmission. On this point, explicit reference is made to the disclosure content of DE 10 2010 030 569 A1: in that case a first input shaft can be coupled with a powershifting element. A second input shaft, arranged in particular coaxially with the first input shaft, is directly connected to a rotor of the electric machine as its drive input. In this way two parallel force transmission branches on the input side can be coupled with one another.

A second possible way to connect or couple the electric machine to the transmission is by arranging a planetary gearset in the transmission: in that case an internal combustion engine can be coupled to a first input shaft by way of an appropriate shifting element, in particular in the form of a separator clutch.

The electric machine on the one hand engages with a second input shaft and on the other hand with the first input shaft of the transmission by way of a planetary gearset. When the separator clutch is actuated, i.e. engaged, the internal combustion engine too is connected via the planetary gearset to the second input shaft. The planetary gearset, comprising a sun gear, a ring gear, planetary gears and a planetary carrier, is designed such that, and co-operates with the internal combustion engine and the electric machine in such manner that the planetary carrier engages with the second input shaft. The electric machine is coupled to the sun gear of the planetary gearset. Moreover, a further shifting element in the form of a lock-up shifting element can be provided, which co-operates with the planetary gearset in such manner that when the lock-up shifting element is actuated there is a rotationally fixed connection between the electric machine, the first input shaft and the second input shaft, while in contrast, when the lock-up shifting element is not actuated, i.e. disengaged, the rotationally fixed connection between the electric machine and the first and second input shafts is absent and in particular, therefore, the rotational speeds of the two input shafts are not equal.

If a further shifting element is arranged between the shifting element that serves to connect the internal combustion engine to the first input shaft and the lock-up shifting element, then by means of this further shifting element, in particular in the form of a dual shifting element, both the aforesaid first connection possibility and the aforesaid second connection possibility can be implemented by actuating the further shifting element.

If the electric machine co-operates with at least one gear plane which comprises a transmission element on a countershaft in the form of a solid shaft, the electric machine can be connected by means of an additional shifting element. If in addition the electric machine co-operates with a transmission element of the at least one gear plane on the input shaft axis, this makes possible a particularly reliable and direct force and torque transmission from the electric machine to the transmission.

Advantageously, most and in particular all but one of the shifting devices are in the form of shifting devices with two shifting elements. The transmission then has fewer shifting positions in total, which increases the reliability of the transmission and simplifies its structure.

Advantageously, the transmission is geometrically stepped. This provides a simple transmission ratio series with equal gear intervals.

Expediently, one gear plane is designed as a drive output constant and can in particular be coupled to the carrier of the planetary gearset. This enables a reliable coupling of the drive output constant to the drive output shaft in the form of a planetary carrier shaft.

Advantageously, by means of a further shifting element between the drive output constant and the planetary gearset the drive output constant can be coupled to the carrier of the planetary gearset. One of the advantages of this is that the essential structure of the transmission does not have to be modified; only a further shifting element is incorporated.

Expediently, to shift the planetary gearset two shifting elements are provided, preferably arranged in a shifting device, which when a further shifting element is provided are arranged on the drive output side or otherwise on the drive input side of the planetary gearset. This makes for a more compact structure and easier integration of the further shifting element.

Other important features and advantages of the invention emerge from the subordinate claims, the drawings and from the associated figure descriptions relating to the drawings.

It is understood that the features mentioned above and those still to be explained can be used not only in the combination described in each case, but also in other combinations or in isolation, without going beyond the scope of the invention.

Preferred designs and embodiments of the invention are illustrated in the drawings and will be explained in more detail in the description given below, wherein the same indexes refer to the same, or similar, or functionally equivalent components or elements.

BRIEF DESCRIPTION OF THE DRAWINGS

The figures show, in each case schematically:

FIG. 3: A shifting matrix for a transmission according to the first embodiment of the present invention;

FIG. 4: A shifting mode for a transmission according to the first embodiment;

FIG. 6: A shifting matrix for the first already known transmission in FIG. 5;

FIG. 7: A method for operating a transmission as in FIG. 5 according to a second embodiment of the present invention;

FIG. 8*b*: An already known shifting matrix for the known transmission of FIG. 8*a;*

FIG. 9: A method for operating the transmission of FIG. 8*a* according to a third embodiment of the present invention;

FIG. 12: A shifting matrix for operating a transmission according to the fourth embodiment shown in FIG. 11.

DETAILED DESCRIPTION OF THE PREFERRED EMBODIMENTS

Figure 1:
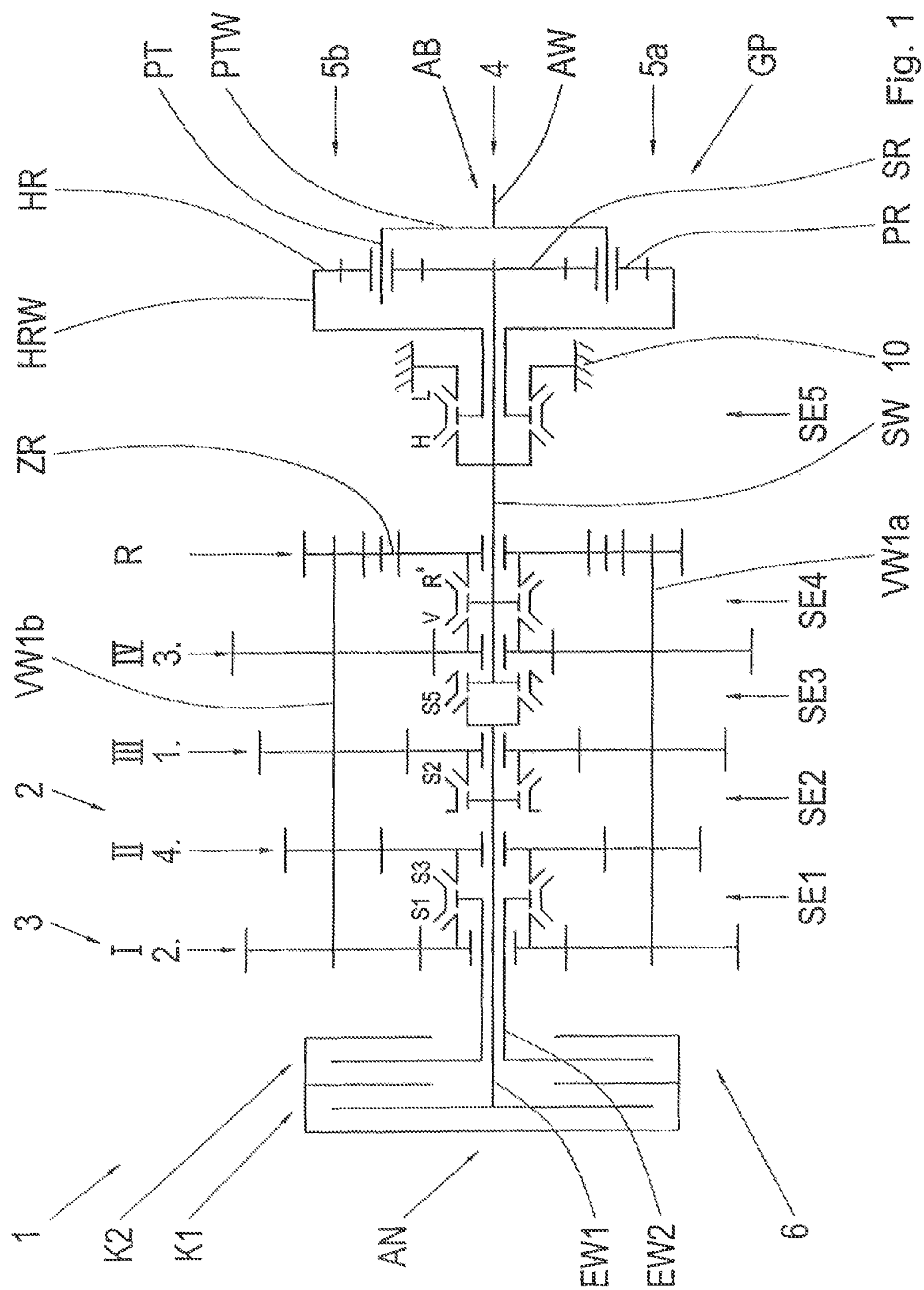
FIG. 1: A transmission according to a first embodiment of the present invention.

FIG. 1 shows a transmission according to a first embodiment of the present invention.

In FIG. 1 the index 1 denotes a transmission in the form of a dual-clutch transmission. The dual-clutch transmission 1 has two powershift elements in the form of clutches K1 and K2. By means of the dual clutch K1, K2 the drive input side AN can be coupled or connected to the drive output side AB of the transmission 1 for the transmission of force and torques. For this purpose the first clutch K1 is connected to a first input shaft EW1 and the second clutch K2 is connected to a second input shaft EW2. The first input shaft EW1 is a solid shaft, whereas the second input shaft EW2 is a hollow shaft. The two input shafts EW1, EW2 are arranged coaxially with and parallel to one another on an input shaft axis 4.

In addition, the transmission 1 comprises two partial transmissions 2, 3. The first partial transmission 2 can be coupled to the first input shaft EW1 and the second partial transmission 3 can be coupled to the second input shaft EW2. With the first partial transmission 2 is associated the third gear plane III, whereas with the second partial transmission 3 are associated the first gear plane I and the second gear plane II. Beginning from the drive input side AN and starting from the two clutches K1, K2, the transmission comprises on the input shaft axis 4 first the first gear plane I, a shifting element S1, a shifting element S3, the second gear plane II, a shifting element S2, the third gear plane III, a shifting element S5, a fourth gear plane IV, a shifting element V, a shifting element R', a reverse gear step R and a planetary gearset GP, which latter will be described in more detail later. Each of the gear planes I to IV and R comprises transmission elements, particularly in the form of gearwheels.

Parallel to the input shaft axis 4 are arranged two countershaft axes 5*a* and 5*b* for an intermediate gear system 6. In this case the intermediate gear system 6 comprises a first countershaft VW1*a* on the first countershaft axis 5*a* and a second countershaft VW1*b* on the second countershaft axis 5*b*. The two countershafts VW1*a*, VW1*b* are solid shafts.

Between the input shaft axis 4 and the countershaft axis 5 the reversing gear stage R has a reversing element in the form of an intermediate gearwheel ZR for reversing the direction of rotation, so that by means of the drive output shaft AW with the same rotational direction of one of the input shafts EW1, EW2 a reversed rotational direction is made possible in order that the transmission 1 can provide at least one reverse gear.

The sequence of gear planes on the countershaft axes 5*a*, 5*b* starting from the drive input side AN corresponds to the sequence of gear planes on the input shaft axis 4.

Below, the six shifting elements S1, S3, S2, S5, V and R' and the five gear planes I to IV, and R will now be described.

All the gear planes I to IV and R comprise on the input shaft axis 4 transmission elements in the sense of loose wheels and on the respective countershaft axis 5*a*, 5*b* in each case transmission elements in the sense of fixed wheels for the countershaft VW1*a*, VW1*b* concerned.

All the shifting elements S1, S3, S2, S5 V, R' are arranged on the input shaft axis 4. Respectively, the shifting elements S1 and S3 and the shifting elements V and R' are arranged together in a first shifting device SE1 and in a fourth shifting device SE4, while in contrast the shifting element S2 is arranged in a second shifting device SE2 and the shifting element S5 is arranged in a third shifting device SE3, in each case on their own.

By means of the shifting element S1 the first gear plane I can be coupled to the second input shaft EW2. By means of the shifting element S3 the second gear plane II can be coupled to the second input shaft EW2. By means of the shifting element S2 the third gear plane III can be coupled to the first input shaft EW1. By means of the shifting element S5 the first input shaft EW1 can be coupled to a sun gear shaft SW of the planetary gearset GP. By means of the shifting element V the fourth gear plane IV can be coupled to the sun gear shaft SW of the planetary gearset GP. By means of the shifting element R' the reverse gear plane R can be coupled to the sun gear shaft SW of the planetary gearset GP.

To actuate the respective shifting devices corresponding shifting element actuating devices can be provided. If the shifting device comprises two shifting elements, these can be in the form of double synchronizers whereas if the shifting device has only one shifting element the device can be a single synchronizer.

The transmission 1 according to FIG. 1 comprises five gear planes I to IV and R. All the gear planes I to IV and R are in particular in the form of spur gear stages with discrete transmission ratios. In each gear plane I to IV and R there are arranged in each case three transmission elements, in particular in the form of gearwheels. However, the reversing gear stage has an additional transmission element in the form of an intermediate gearwheel ZR between the input shaft axis 4 and the countershaft axis 5*a*, 5*b* concerned.

Below, the structure of the range group in the form of a planetary gearset GP will now be described. The planetary gearset GP is connected to the main transmission, which comprises the gear planes I to IV and R as well as the shifting elements S1, S3, S2, S5, V and R', by way of the sun gear shaft SW, the sun gear shaft SW being connected to the sun gear SR of the planetary gearset GP and being a solid shaft. The planetary gearset GP is essentially configured in the usual manner and comprises the central sun gear SR, which is connected to the sun gear shaft SW and which meshes with at least one planetary gearwheel PR on its radially outer side. The planetary gearwheel or gearwheels PR is/are mounted to rotate on a planetary carrier PT, also called a web. On the radially outer side of the planetary carrier PT in turn a ring gear HR of the planetary gearset GP is arranged, with which the planetary gearwheel(s) engage (s). The planetary carrier PT is connected to a planetary carrier shaft PTW on the drive output side of the planetary gearset GP. In this case the planetary carrier shaft PTW is designed to be the drive output shaft AW. The ring gear HG is connected to a ring gear shaft HRW in the form of a hollow shaft, which is arranged on the drive input side of the planetary gearset GP partially parallel to and coaxial with the sun gear shaft SW and radially outside the latter. By means of the shifting element H, the sun gear shaft SW can be coupled to the ring gear shaft HRW. By means of the shifting element L, the ring gear shaft HRW can be coupled to the housing 10 of the transmission 1. "L" stands for the "Low" transmission ratio and "H" stands for the "High" transmission ratio, so that the planetary gearset divides a gear obtained in the main transmission further into two gears with different transmission ratios.

The two shifting elements H and L are arranged in a shared shifting device SE5 on the input shaft axis 4, as also are the drive output shaft AW and the sun gear shaft SW. In this case the shifting device SE5 is arranged on the drive input side of the planetary gearset GP.

Figure 2:
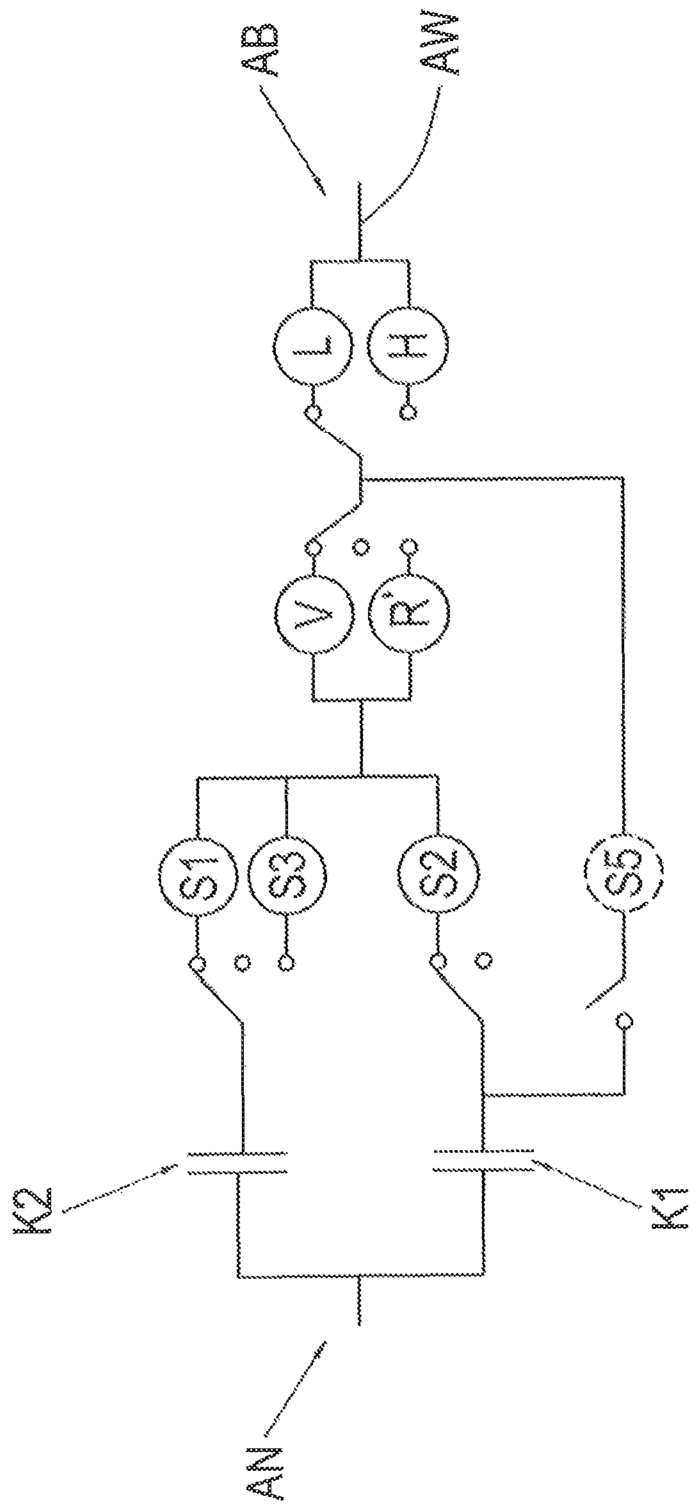
FIG. 2: A function diagram for a transmission according to the first embodiment of the present invention.

FIG. 2 shows a function diagram for a transmission according to the first embodiment of the present invention.

In FIG. 2 the function diagram for a dual-clutch transmission according to FIG. 1 is shown, with which transmission at least twelve forward gears can be obtained. In this case, by means of the second clutch K2 and the second input shaft EW2, the first shifting device SE1 with the shifting elements S1 and S3 can be connected to the drive input, and by means of the first clutch K1 and the first input shaft EW1 the shifting element S2 or the fifth shifting element S5 can be connected to the drive input.

If either the shifting element S1 or the shifting element S3 is engaged, the force and torque flow passes from the input shaft axis 4 to the intermediate gear system 6 and can then be passed back again to the input shaft axis 4 by way of the shifting element V or the shifting element R'. By means of the further shifting elements L, H of the planetary gearset GP, a further division of the transmission ratio for the drive output can then take place.

By means of the clutch K1, on the one hand the shifting element S2 can be connected into the force or torque flow from the drive input and the force or torque flow can pass from the input shaft axis 4 to the intermediate gear system 6 via the third gear plane III. By means of the shifting elements V and R' this can then pass back again to the input shaft axis 4 and farther on to the planetary gearset GP, which can provide further transmission ratios for the drive output shaft AW when the shifting elements L and H are actuated. By means of the fifth shifting element S5 a direct gear is made possible, since the input shaft EW1 is directly connected to the sun gear shaft SW of the planetary gearset GP. Then, the two shifting elements L and H of the planetary gearset GP enable two direct gears with different transmission ratios at the drive output shaft AW.

FIG. 3 shows a shifting matrix for a transmission according to the first embodiment of the present invention.

FIG. 3 shows a shifting matrix for a transmission according to FIG. 1. The shifting matrix of FIG. 3 and the later shifting matrices in the description and the figures, have essentially the same structure. Horizontally, columns are provided which show the corresponding gear, the forward gears being denoted by V and the reverse gears by R, as well as the transmission ratio i provided at the drive output shaft AW and the respective gear interval $\phi$ between two successive gears, and the shifting elements that are disengaged and engaged for obtaining the gear concerned. The gear interval $\phi$ is entered by the higher gear in each case. The indexes K1 and K2 denote the two clutches and the indexes A to H and S1, S2, S3, S5, V, R', L and H denote the respective shifting elements.

For the respective gears, when a dark spot is entered in a particular column this means that the associated shifting element or clutch is engaged for the corresponding gear. If the spot is absent, the respective shifting element or clutch is disengaged. Thus, the entries left blank in the shifting matrix indicate that the corresponding shifting element or the corresponding clutch is disengaged, i.e. that the shifting element or clutch does not transmit any forces or torque from the shafts connected to the shifting element or clutch, or to the respective shafts or transmission elements connected to the shifting element or clutch concerned. Thus, an entry provided with a spot in the shifting matrix denotes that the relevant shifting element or clutch is correspondingly actuated or engaged and therefore transmits forces or torques between the shafts or transmission elements connected to the shifting element or clutch. For example, the first line of the shifting matrix in FIG. 3 will now be described. The first forward gear V1 produces a total transmission ratio of 16.370 and to obtain this first forward gear V1 the clutch K2 and the shifting elements S1, V and L are engaged, whereas the shifting elements S2, S3, S5, R' and H are disengaged, as is the clutch K1. Between the first forward gear V1 and the next-higher forward gear V2 there is a gear interval of $\phi$=1.317.

FIG. 4 shows a shifting mode for a transmission according to the first embodiment.

In FIG. 4 examples of shifting modes for the upshifts in a transmission according to FIGS. 1 to 3 are shown. The downshifts take place analogously in the reverse sequence.

The table shows from which gear to which gear a shift is made, and whether the shift takes place with traction force interruption, or as a powershift, or as a shift with a supporting gear. The shifts from the first to the second gear, from the second to the third gear, from the fourth to the fifth gear, from the fifth gear to the sixth gear and from the third to the fifth gear take place as powershifts. The shift from the third to the fourth gear can either take place with traction force interruption or by way of the fifth gear as a supported gearshift. The shifts from the first to the third gear, from the second to the fourth gear and from the fourth to the sixth gear take place with traction force interruption. The further shifts of gears 6 to 12 take place analogously. As can be seen from the table in FIG. 3, they differ only in that the shifting element H is actuated instead of the shifting element L of the planetary gearset GP.

Thus, by means of the transmission according to FIGS. 1 to 4 twelve forward gears V1 to V12 and six reverse gears R1 to R6 can be obtained. Furthermore, the transmission 1 according to FIGS. 1 to 4 is geometrically graded and the main transmission of the transmission 1, i.e. the transmission of FIG. 1 without the range group in the form of the planetary gearset GP, has six powershiftable gears and, with the range group, twelve powershiftable gears. The traction-force-interrupted gearshift from the third to the fourth gear can be bypassed by a supported gearshift via the fifth gear or a powershiftable double gear interval from the third forward gear to the fifth forward gear. The fifth or eleventh forward gear is in this case designed as a direct gear. This has the advantage that only the central shafts rotate on the input shaft axis 4 and the gear planes are not involved, which makes for lower drag losses. If an oil pump is arranged on the countershaft, this is connected to the third gear plane III so that the shifting element S2 is engaged in the direct gear. In this case the shifting elements S2 and S5 can also be combined as a dual shifting element.

Figure 5:
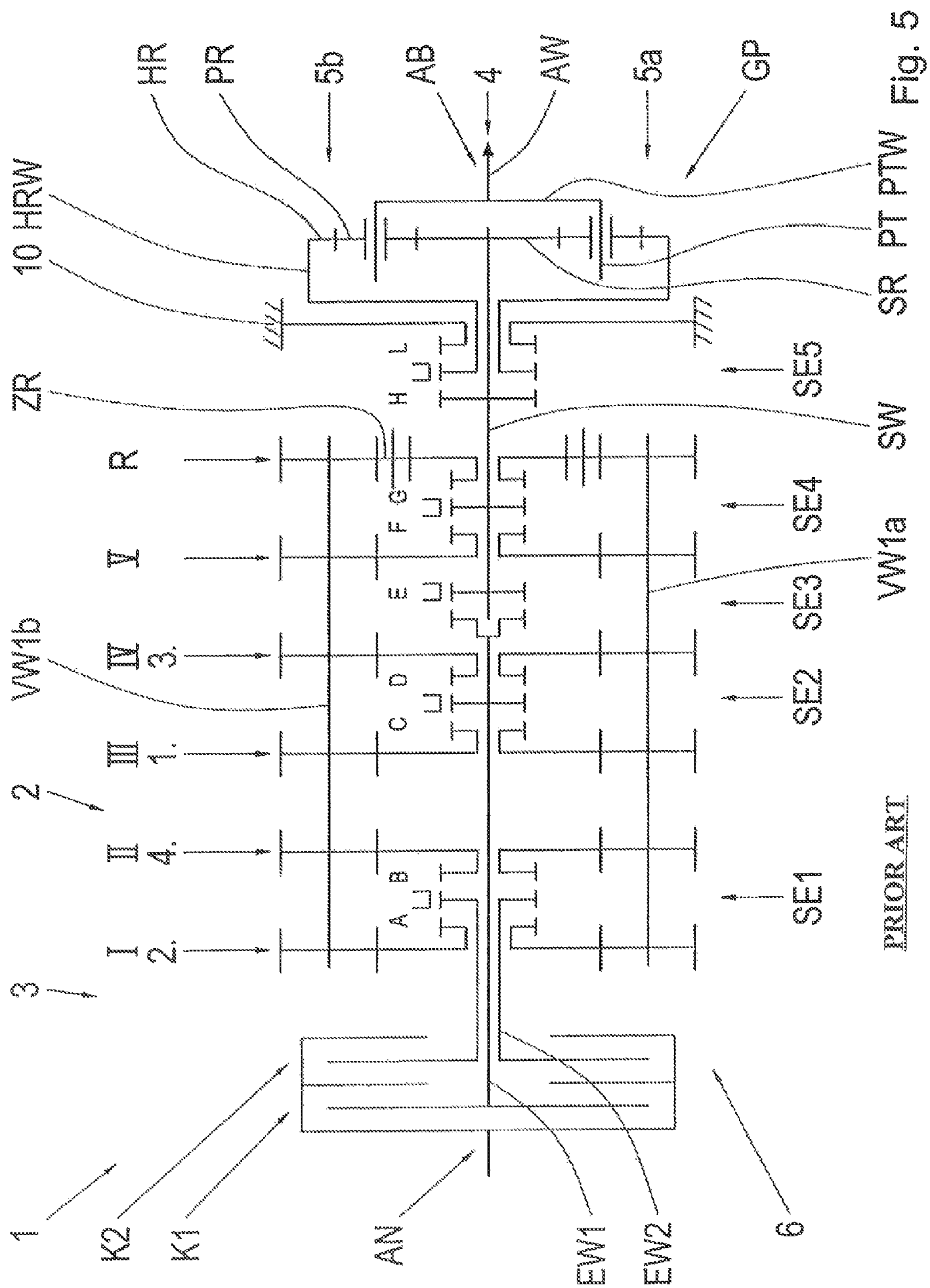
FIG. 5: A first already known transmission.

FIG. 5 shows a first already known transmission.

FIG. 5 shows a transmission 1 substantially like that of FIG. 1. Otherwise than in the transmission 1 of FIG. 1, the transmission 1 according to FIG. 5 now has six gear planes I to V and R. In this case the shifting elements A and B couple the first gear plane I or the second gear plane II, respectively, to the second input shaft EW2, the shifting elements C and D couple the third gear plane or the fourth gear plane IV, respectively, to the first input shaft EW1, the shifting element E couples the first input shaft EW1 to the sun gear shaft SW, and the shifting elements F and G couple the fifth gear plane V or the reverse gear stage R, respectively, to the sun gear shaft SW. The sequence of gear planes and shifting elements on the input shaft axis 4 is therefore as follows: first gear plane I, shifting element A, shifting element B, second gear plane II, third gear plane III, shifting element C, shifting element D, fourth gear plane IV, shifting element E, fifth gear plane V, shifting element F, shifting element G, reverse gear stage R, and planetary gearset GP. The shifting elements A, B are arranged in a first shifting device SE1, the shifting elements C, D in a second shifting device SE2, the shifting element E in a third shifting device SE3, and the shifting elements F, G and H, L in a fourth and fifth shifting device SE4, SE5, respectively.

FIG. 6 shows a shifting matrix for the first, already known transmission in FIG. 5.

FIG. 6 shows an already known shifting matrix with example transmission ratios for a transmission 1 according to FIG. 5.

Thus, in FIGS. 5 and 6 a dual-clutch transmission with a range group of planetary design is shown. The two partial transmissions 2, 3 are each coupled to a respective input shaft EW1, EW2. The output sides of the two partial transmissions 2, 3 are in each case connected to the input shaft of the range group GP, i.e. in this case to the sun gear shaft SW. Associated with the second partial transmission 3 there are thus two gears by virtue of the gear planes I and II and the shifting elements A and B, whereas in contrast, associated with the first partial transmission 2 there are three gears by virtue of the gear planes III and IV and also the direct gear and the shifting elements C, D and E. The fifth gear plane V and the reverse gear stage R serve here as drive output constants for forward and reverse gears, which can be engaged by means of the shifting elements F and G. The direct gear is the fifth gear in the main transmission, i.e. the transmission without the range group GP. In the sixth gear or twelfth gear, of which the latter can be designed as an overdrive gear, the two partial transmissions 2, 3 are coupled to one another. In this coupled gear one of the drive input gear planes III, IV of the first partial transmission 2 is used as the drive output gear plane for the second partial transmission 3. The drive output leads by way of the direct gear shifting element E, i.e. the first partial transmission 2 is "forced" into the direct gear. A next-higher gear can therefore not be powershifted. However, during a load change from the sixth gear to the seventh gear, the traction-force-interrupted range group GP is engaged, so the shift from the sixth gear V6 to the seventh gear V7 can only take place with traction force interruption.

FIG. 7 shows a method for operating a transmission according to FIG. 5 in accordance with a second embodiment of the present invention.

FIG. 7 essentially shows a shifting matrix as in FIG. 6 for operating a transmission as in FIG. 5. Otherwise than in the shifting matrix of FIG. 6, the shifting matrix of FIG. 7 comprises an additional coupling gear in the second partial transmission 3, which is added as a new fifth forward gear V5 directly before the direct gear V6 in the main transmission. In this case the forward gear V5 produces the transmission ratio of a single geometrical gear interval, in this case for example of 1.27. The new direct gear is therefore the sixth forward gear V6. The sequential powershifting during the shift from the fourth forward gear V4 to the fifth forward gear V5 is enabled by a supported gearshift: starting from the fourth forward gear V4, the direct gear, i.e. the sixth forward gear V6, is preselected in the first partial transmission 2. With the clutch K1 slipping the traction force is supported, whereas in the second partial transmission 3 a load-free gearshift from the fourth forward gear V4 to the fifth forward gear V5 is carried out. Alternatively to the supported gearshift described above, a direct powershift from the fourth forward gear V4 to the sixth forward gear V6 is also possible, which is advantageous during accelerated driving.

Advantageous for a transmission operated in accordance with the shifting matrix shown in FIG. 7 is that an additional gear is enabled in the main transmission, i.e. two gears in the group transmission with the range group in the form of a planetary gearset, as shown in FIG. 5. In this case the structural complexity is no greater despite the larger number of forward gears. This makes possible a larger spread and smaller gear intervals, which enables the transmission gradation to be finer.

There are other alternative embodiments (not shown) of the transmission according to FIG. 5: for example, the axial positions of the first gear plane I and the second gear plane II in the transmission can be exchanged, i.e. the gear allocation in the second partial transmission 3 can be exchanged, and/or the axial positions of the third gear plane III and the fourth gear plane IV in the transmission can be exchanged, which enables an interchange of the gear allocation in the first partial transmission 2.

Figure 8A:
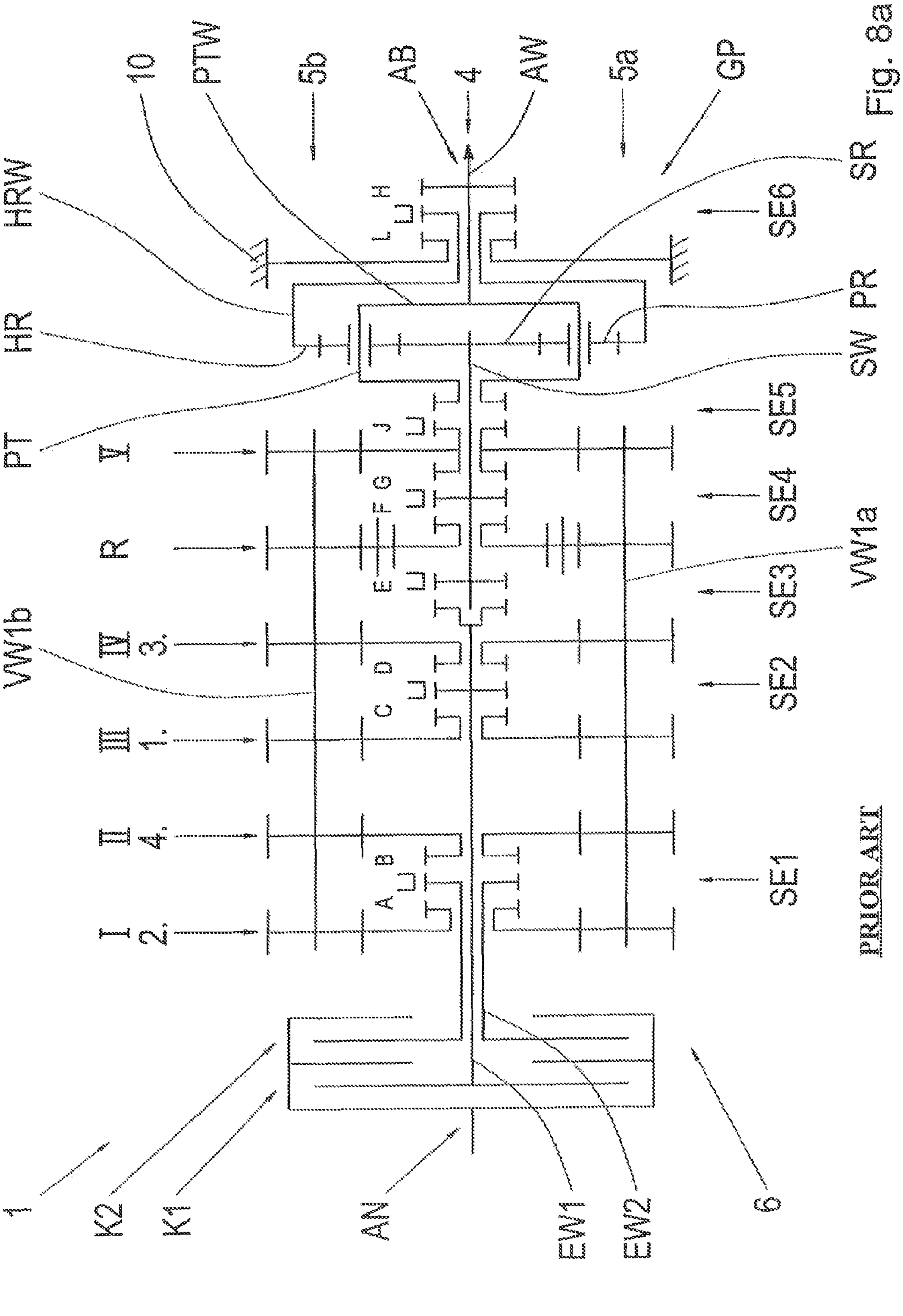
FIG. 8*a*: A second known transmission.

FIG. 8*a* shows a second known transmission.

FIG. 8*a* shows a transmission 1 substantially the same as that in FIG. 5. Otherwise than in the transmission 1 in FIG. 5, in the transmission 1 according to FIG. 8*a* the reverse gear stage R is arranged between the fourth gear plane IV and the fifth gear plane V and can be coupled to the sun gear shaft SW by means of the shifting element F. Also otherwise than in the transmission 1 of FIG. 5, in FIG. 8*a* the fifth gear plane V can be coupled to the sun gear shaft SW by means of the shifting element G and can also be coupled to the planetary carrier shaft PTW of the planetary gearset GP by means of a further shifting element J. Thus, otherwise than in the transmission 1 of FIG. 5, the planetary carrier shaft PTW in FIG. 8*a* has a section which extends on the drive input side of the planetary gearset GP.

The two shifting elements H and L are now positioned on the drive output side of the planetary gearset GP. Furthermore, the ring gear shaft HRW can be coupled to the housing 10 by means of the shifting element L and to the drive output shaft AW by means of the shifting element H. In the already known shifting matrix an overdrive coupling gear is possible only as the highest forward gear (eleventh gear), as shown in the shifting matrix according to FIG. 8*b*. The "inner" overdrive gear is missing, because otherwise the transmission would not have complete powershifting ability. Owing to this omission the fifth gear V5, the direct gear in the "Low" range, and the sixth gear, the first gear V6 in the main transmission in the "High" range, are both in the same (the first) partial transmission. The shift from the fifth forward gear V5 to the sixth forward gear V6 must therefore be carried out as a supported gearshift with the seventh gear V7 as the supporting gear.

FIG. 9 shows a method for operating the transmission according to FIG. 8*a* in accordance with a third embodiment of the present invention.

In FIG. 9 a shifting matrix is now shown for a transmission according to FIG. 8*a*. In this case an additional coupling gear is added in the second partial transmission 3 as a new fifth forward gear V5, and this as the gear immediately before the direct gear, now the forward gear V6 in the main transmission. The coupling gear produces the transmission ratio of the single geometrical gear interval, with $\phi=1.30$ in FIG. 9 in this case. The new direct gear is therefore the sixth forward gear V6. Sequential powershifting is obtained in the shift from the fourth forward gear V4 to V5 by a supported gearshift: starting from the fourth forward gear V4, the direct gear V6 is preselected in the first partial transmission 2. With the clutch K1 slipping the traction force is supported, while in the second partial transmission 3 a load-free gearshift from the fourth forward gear V4 to the fifth forward gear V5 is carried out. Alternatively to a supported gearshift, a direct powershift from the fourth forward gear V4 to the sixth forward gear V6 is also possible, which is advantageous in accelerated driving. The gear interval is then $\phi=1.30^2=1.69$. The supported gearshift from the sixth forward gear V6 to the seventh forward gear V7 in combination with the group change from "Low" to "High" in the range group with the planetary gearset GP in this case corresponds to the shift from the fifth forward gear V5 to the sixth forward gear V6 according to FIG. 8*b*.

When a transmission is operated in accordance with the shifting matrix of FIG. 9, one more gear can be obtained in the main transmission, i.e. two more gears in the group transmission with identical structural complexity, so that a thirteen-gear overdrive gearset that can be fully powershifted is provided. This enables a larger spread or smaller gear intervals and thus a more finely graded transmission.

Figure 10:
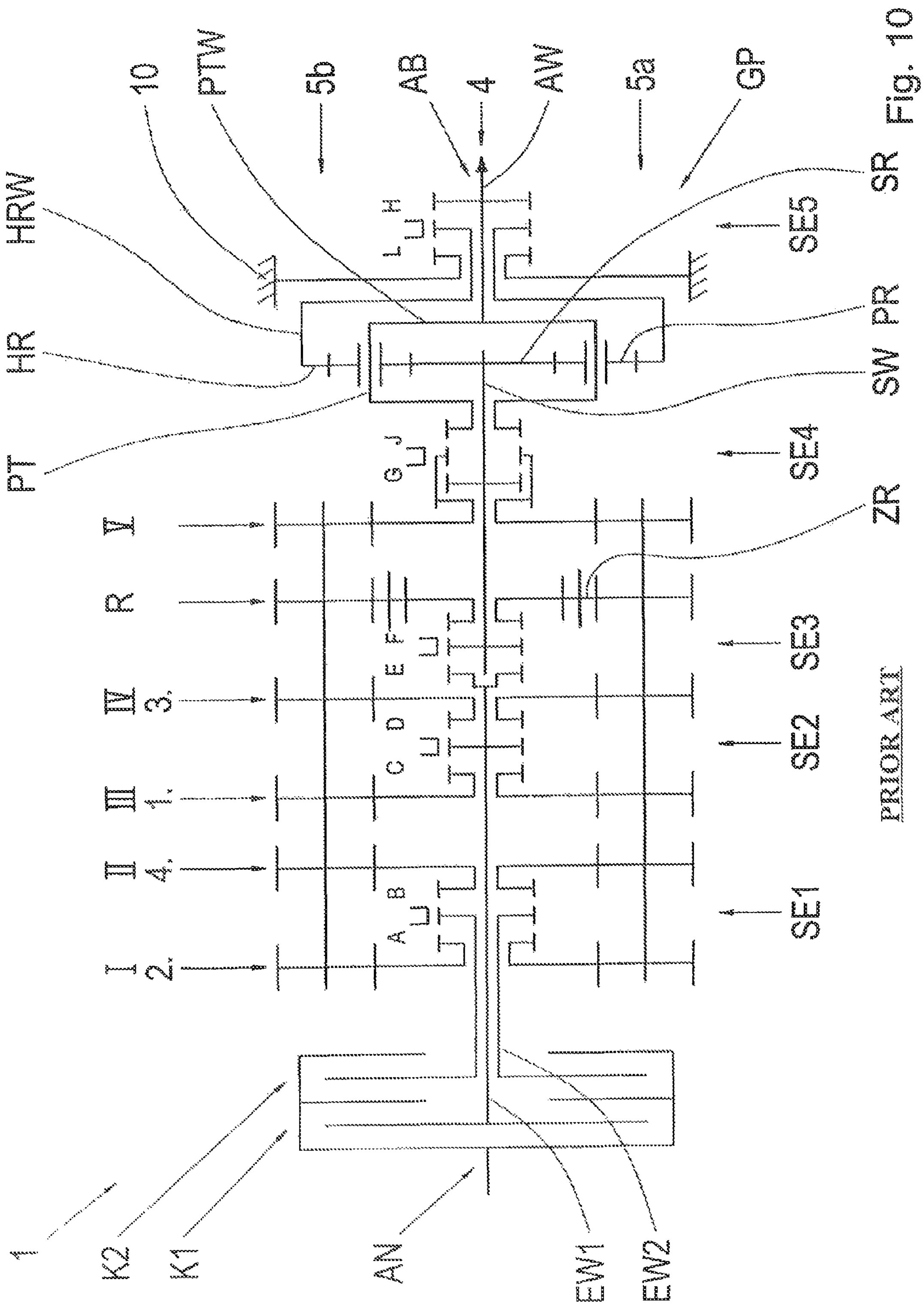
FIG. 10: A further known transmission for operating with a shifting matrix according to FIG. 9.

FIG. 10 shows a further known transmission for operating with a shifting matrix according to FIG. 9.

In FIG. 10 a transmission 1 essentially the same as that in FIG. 8*a* is shown. Otherwise than in the transmission 1 of FIG. 8*a*, in the transmission 1 shown in FIG. 10 the shifting element E and the shifting element F are arranged as a dual shifting element in the third shifting device SE3 and the shifting element G and the shifting element J are arranged together in the fourth shifting device SE4. In terms of their axial positions on the input shaft axis 4 the shifting element F is now arranged between the shifting element E and the reverse gear stage R, and the shifting element G is between the fifth gear plane V and the shifting element J. The advantage of this is that fewer shift positions in total are made possible.

Moreover, the axial positions of the gear planes II and I in the transmission can be exchanged, which interchanges the gear allocation in the second partial transmission 3. The same can be done analogously for the first partial transmission 2. The axial positions of the third gear plane III and the fourth gear plane IV in the transmission can be exchanged, which interchanges the gear allocation in the first partial transmission 2.

Figure 11:
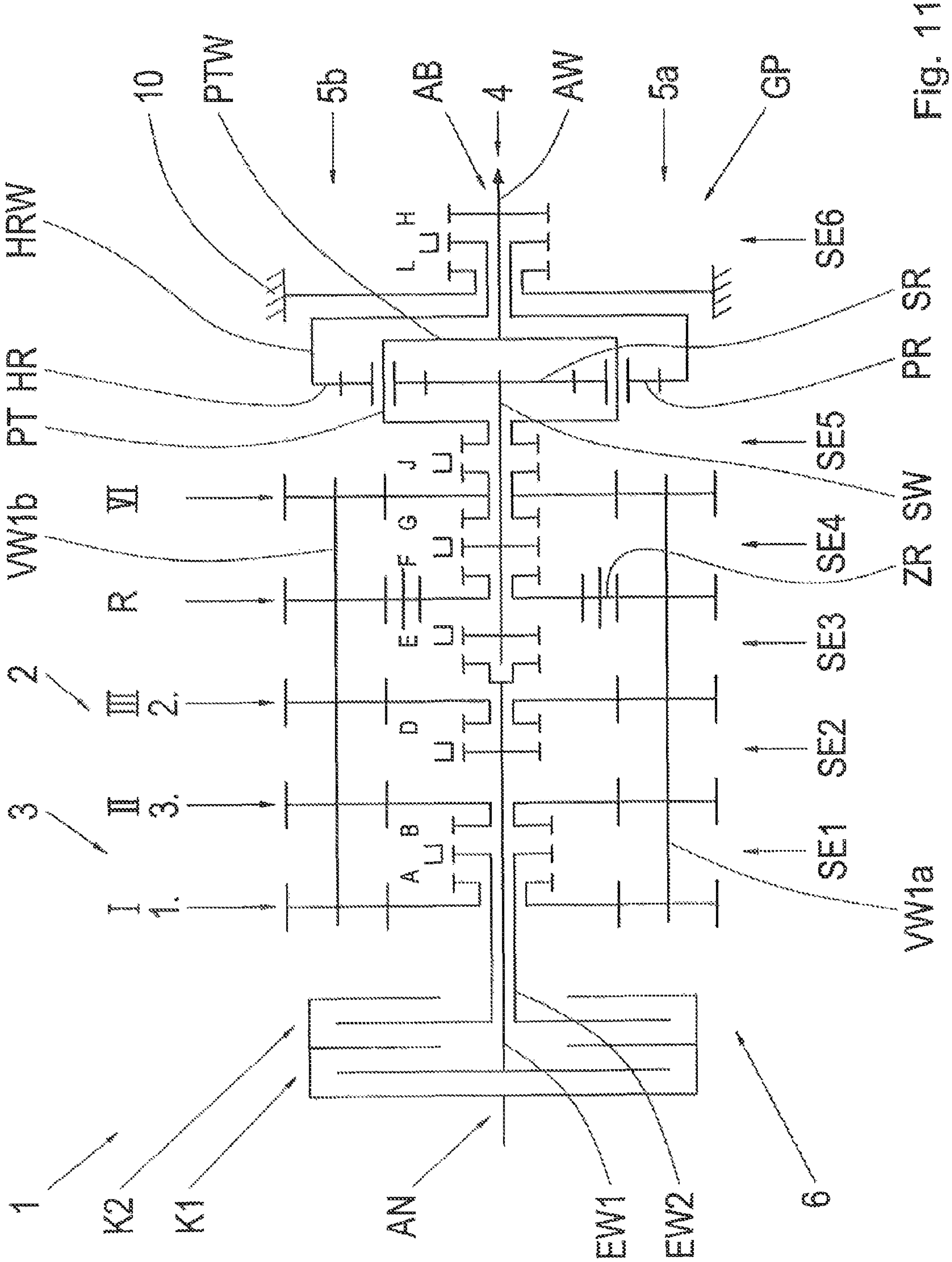
FIG. 11: A transmission according to a fourth embodiment of the present invention.

FIG. 11 shows a transmission according to a fourth embodiment of the present invention.

FIG. 11 shows a transmission 1 essentially the same as in FIG. 1. Otherwise than in the transmission 1 of FIG. 1, in the transmission 1 of FIG. 11 the axial positions of the fourth gear plane IV and the reverse gear stage R on the input shaft axis 4 or the countershaft axes 5*a* and 5*b* are interchanged. In this case the shifting element S1 corresponds to the shifting element A, the shifting element S3 corresponds to the shifting element B, the shifting element S2 corresponds to the shifting element D, the shifting element S5 corresponds to the shifting element E, the shifting element R' corresponds to the shifting element F and the shifting element V corresponds to the shifting element G. A further difference from the transmission 1 in FIG. 1 is that in the transmission 1 according to FIG. 11 the sixth shifting device SE6, which combines the two shifting elements L and H, is arranged on the drive output side of the planetary gearset GP. Still another difference from the transmission 1 according to FIG. 1 is that in the transmission 1 of FIG. 11 a further shifting element J is provided which, when actuated, connects the planetary carrier shaft PTW to the fourth gear plane IV. The planetary carrier shaft PTW in the transmission 1 of FIG. 11 has a section which is also arranged on the drive input side of the planetary gearset GP. The shifting element G (corresponding to the shifting element V in FIG. 1), when actuated, enables the fourth gear plane IV to be coupled to the sun gear shaft SW of the planetary gearset GP.

FIG. 12 shows a shifting matrix for operating a transmission according to the fourth embodiment in FIG. 11.

FIG. 12 shows a shifting matrix with example transmission ratios for a transmission 1 according to FIG. 11. The drive output constant, namely here the fourth gear plane IV, is designed to be connected to the web or planetary carrier PT of the planetary gearset GP by means of the shifting element J. The "inner" overdrive gear is omitted so that complete powershifting is enabled. The overdrive coupling gear can only be used as the highest gear, i.e. the forward gear V11.

Figure 13:
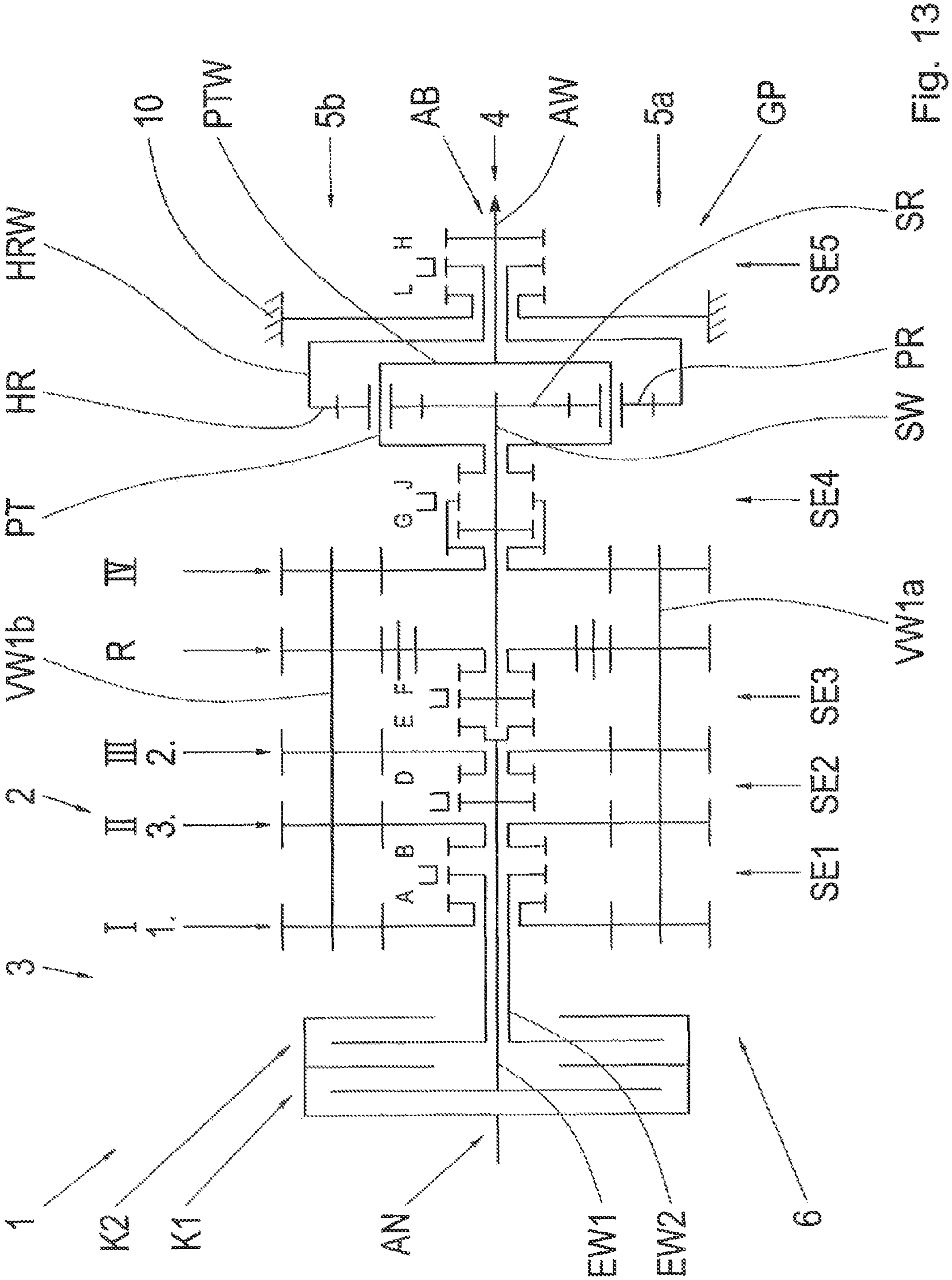
FIG. 13: A transmission according to a further embodiment of the present invention.

FIG. 13 shows a transmission according to a further embodiment of the present invention.

FIG. 13 shows essentially a transmission 1 according to FIG. 11. Otherwise than in the transmission 1 according to FIG. 11, in the transmission 1 according to FIG. 13 the shifting element E and the shifting element F are combined as a dual shifting element in the third shifting device SE3 and the shifting element G and the shifting element J are combined in the fourth shifting device SE4. This makes it possible to have fewer shifting positions in the transmission. The shifting element F is now positioned on the drive input side of the reverse gear stage R and the shifting element G is now positioned on the drive output side of the fourth gear plane IV.

Furthermore, in the transmission 1 of FIG. 11 and the transmission 1 according to FIG. 13 as well, the gear allocation in the second partial transmission 3 can be interchanged, i.e. the axial positions of the first gear plane I and the second gear plane II in the transmission 1 can be interchanged.

In summary, the transmissions on the one hand have less structural complexity than the already known transmissions. Moreover, more powershiftable gears are made available and in particular the transmissions and methods for operating a transmission in each case have functional advantages compared with the already known transmissions. Further advantages are, among others, that the transmissions can be made sufficiently compact and that they provide a large number of forward and reverse gears, which essentially increases their utility in a variety of vehicles.

Although the present invention has been described above with reference to preferred example embodiments, it is not limited to those but can be modified in many ways.

INDEXES

1 Transmission
2,3 First and second partial transmission
4 Input shaft axis
5*a*, 5*b* Countershaft axes
6 Intermediate gear system
Housing
K1, K2 Clutches
VW1*a*, VW1*b* Countershafts
SW Sun gear shaft
HR Ring gear
HRW Ring gear shaft
PR Planetary gearwheel
PT Planetary carrier I web
PTW Planetary carrier shaft
SR Sun gear
SW Sun gear shaft
AN, AB Drive input, drive output
ZR Intermediate gearwheel
GP Planetary gearset
I, II, III, IV Gear planes
R Gear plane for the reverse gear stage
SE1, SE2, SE3, SE4, SE5, SE6 Shifting devices
A, B, C, D, E, F, G, H, J, L, H, S1, S2, S3, S5, V, R' Shifting elements
V1, V2, V3, V4, V5, V6, V7, V8, V9, V10, V11, V12, V13, V14 Forward gears
R1, R2, R3, R4, R5, R6 Reverse gears
i Transmission ratio
ϕ Gear interval

The invention claimed is:

1. A method of operating a dual-clutch transmission for a motor vehicle which comprises at least first and second partial transmissions (2, 3), each of the first and the second partial transmissions (2, 3) having at least one input shaft (EW1, EW2) on a drive input side (AN) of the transmission (1), which are arranged on an input shaft axis (4), and an output shaft as a drive output shaft (AW) of the first and the second partial transmissions (2, 3) on a drive output side (AB) of the transmission (1), the method comprising the steps of:

arranging the drive output shaft (AW) on the input shaft axis (4), an intermediate gear system (6) having two countershafts, each of the countershafts being arranged on a respective countershaft axis (5*a*, 5*b*), connecting at least one of the input shafts (EW1, EW2) to the drive output shaft (AW) by at least one of:

at least one gear plane (I, II, III, IV, R), and at least one shifting element (A to H, J, L), arranging at least four forward gear planes (I, II, III, IV, V) for obtaining a plurality of forward gears and arranging a reverse gear plane for obtaining at least one reverse gear, and each of the forward gear planes and the reverse gear plane comprises fixed gears, providing at least six shifting elements (A to H, J, L), arranging only one of the two countershafts (VW1*a*; VW1*b*) on each of the countershaft axes, (5*a*, 5*b*), each of the countershafts only having the fixed gears of the forward gear planes and the reverse gear plane as transmission elements, and fixing the fixed gears of the reverse gear plane on an output side end of the countershafts such that the reverse gear plane is an axially final gear plane along the countershaft axes, obtaining at least the plurality of forward gears (V1 to V14) and the at least one reverse gear (R1 to R4) via the transmission (1), forming at least one of the plurality of forward gears obtainable by the transmission (1) as a direct gear (V5, V11; V5, V10) such that, when the direct gear (V5, V11; V5, V10) is engaged, all the shifting elements for coupling the intermediate gear system (6), via the forward and the reverse gear planes, into a force flow are disengaged, and each of the forward and the reverse gear planes (I to V, R) is couplable, by a respective one of the at least six shifting elements (A to H) arranged on the input shaft axis (4), to one of the input shafts, the output shaft and the countershafts (EW1, EW2, SW, HRW, PTW), and one of the plurality of forward gears (V5, V12; V5, V11) that is next-lower than the direct gear (V6, V13; V6, V12) is a coupling gear.

2. The method according to claim 1, further comprising the step of associating the next-lower gear (V5, V12; V5, V11), designed as the coupling gear, and associating another gear (V4, V11; V4, V10) that is next-lower than the coupling gear (V5, V12; V5, V11) with the second partial transmission (3) and associating the direct gear (V6, V13; V6, V12) with the first partial transmission (2).

3. The method according to claim 1, further comprising the step of achieving the force flow from the drive input side (AN) to the drive output side (AB) for the coupling gear (V5, V12; V5, V11) from the input shaft axis (4), by way of the intermediate gear system (6) and back to the input shaft axis (4), and thereafter analogously to a force flow of the direct gear (V6, V13; V6, V12).

4. The method according to claim 1, further comprising the step of engaging gears (V4, V5; V10, V11) that are directly adjacent in one of the first and the second partial transmissions (3) by a supported gearshift.

5. The method according to claim 4, further comprising the step of preselecting the direct gear (V6, V13; V6, V12), when two next-lower gears (V4, V5; V10, V11) are engaged before the direct gear (V6, V13; V6, V12).

6. The method according to claim 4, further comprising the step of supporting traction force for the supported gearshift by way of the direct gear (V6, V13; V6, V12) and via the first partial transmission (2), with which two next-lower gears (V4, V5; V10, V11) before the direct gear (V6, V13; V6, V12) are not associated.

7. The method according to claim 1, further comprising the steps of arranging a planetary gearset (GP) on the drive output shaft (AW) of the transmission (1), and the drive output shaft (AW) is a sun gear shaft (SW) of the planetary gearset (GP) and forming a new drive output shaft (AW) of the transmission (1) via a planetary carrier shaft (PTW), arranging the at least four forward gear planes, from the drive input side to the drive output side of the transmission, in an order of a first forward gear plane, a second forward gear plane, a third forward gear plane and a fourth forward gear plane such that the sun gear shaft is connectable, between the third and the fourth forward gear planes, only to one of the input shafts.

8. The method according to claim 7, further comprising the steps of coupling the sun gear shaft (SW) to a ring gear shaft (HRW) of the planetary gearset (GP) in order to provide a transmission ratio of 1, and arranging the second and the third forward gear planes such that, between the second and the third forward gear planes, only the third forward gear plane is connectable to the one of the input shafts.

9. The method according to claim 1, further comprising the step of, starting from the direct gear (V6, V13; V6, V12), achieving a direct powershift from a next-but-one lower gear (V4, V10) to the direct gear (V6, V13; V6, V12).

10. The method according to claim 1, further comprising the step of achieving a force flow from the drive input side (AN) to the drive output side (AB) in at least one of the forward and the reverse gears by way of the intermediate gear system (6) having the respective countershafts (VW1*a*, VW1*b*) on the two countershaft axes (5*a*, 5*b*).

11. The method according to claim 6, further comprising the step of obtaining at least 11 forward gears (V1 to V11) and at least four reverse gears (R1 to R4) by the transmission (1).

12. The method according to claim 1, further comprising the step of geometrically grading gears of the transmission (1).

13. The method according to claim 1, further comprising the step of operating the transmission with six gear planes (I to V, R) and seven shifting elements (A to H, J, L).

14. A dual-clutch transmission for a motor vehicle, the transmission comprising:

at least two partial transmissions (2, 3), and each of the partial transmissions (2, 3) having at least one input shaft (EW1, EW2) on a drive input side (AN) of the transmission (1) which are arranged on an input shaft axis (4);

an output shaft as a drive output shaft (AW) of the at least two partial transmissions (2, 3) on a drive output side (AB) of the transmission (1), and the drive output shaft (AW) being arranged on the input shaft axis (4);

an intermediate gear system (6) having two countershafts that are arranged on a respective countershaft axis (5*a*, 5*b*);

at least one of the input shafts (EW1, EW2) is connectable to the drive output shaft (AW) by at least one gear plane (I, II, III, IV, R) and at least one shifting element (A, B, D to H, J, L);

at least six shifting elements (A to G);

on each of the countershaft axes (5*a*, 5*b*), only one of the countershafts (VW1*a*; VW1*b*) is arranged, and each of the countershafts only has fixed gears as transmission elements, a plurality of forward gears (V1 to V11) and a plurality of reverse gears (R1 to R3) are engagable by the transmission (1), and at least one of the forward gears engagable by the transmission (1) is a direct gear (V5, V10);

only first, second, third and fourth forward gear planes (I, II, III, IV) are provided for obtaining the plurality of forward gears and via the first, the second, the third and the fourth forward gear planes (I, II, III, IV) and via six shifting elements (A, B, D, E, F, G), at least 6 forward gears (V1 to V6) are engagable; a reverse gear plane is provided for obtaining a plurality of reverse gears, each of the first, the second, the third and the fourth forward gear planes and the reverse gear plane comprises two of the fixed gears of the countershafts and a loose gear rotatably supported about the input shaft axis, and the transmission (1) is designed such that at least all gearshifts between adjacent forward gears are powershiftable;

the first, the second, the third and the fourth forward gear planes and the reverse gear plane are arranged axially along the countershafts from the drive input side to the drive output side of the transmission in an order of the first forward gear plane, the second forward gear plane, the third forward gear plane, the fourth forward gear plane, and the reverse gear plane;

the fourth forward gear plane and the reverse gear plane are connectable to the drive output shaft at an axial location between the fourth forward gear plane and the reverse gear plane.

15. The transmission according to claim 14, wherein the reverse gear plane (R) is arranged downstream from the first, the second, the third and the fourth gear planes relative to a force flow from the drive input side to the drive output side (AB), and at least one of the six shifting elements is axially located between the fourth gear plane and the reverse gear stage.

16. The transmission according to claim 14, wherein at an axial location between the third and the fourth forward gear planes, the drive output shaft is directly connectable to only the input shafts (EW1, EW2).

17. The transmission according to claim 14, wherein a planetary gearset (GP) is arranged on the drive output shaft (AW) of the transmission (1), in such manner that the drive output shaft (AW) is a sun gear shaft (SW) of the planetary gearset (GP) and a planetary carrier shaft (PTW) is the drive output shaft (AW) of the transmission (1), and a ring gear shaft of the planetary gearset is directly connectable to the sun gear shaft.

18. The transmission according to claim 14, wherein an electric machine (EM) is arranged on at least one of:

at least one transmission element of a gear plane (I, II, III, IV, R), at least one countershaft (VW1*a*, VW1*b*), and at least one of the shafts (EW1, EW2, SW) on the input shaft axis (4)

in order to hybridize the transmission (1) via at least one of an additional shifting element and a transmission element connected thereto.

19. The transmission according to claim 14, wherein all of the shifting devices (SE1, SE3, SE4, SE6), except one shifting device (SE2), are shifting devices which have two shifting elements.

20. The transmission according to claim 14, wherein the transmission (1) is designed in a geometrically graded manner.

21. The transmission according to claim 17, wherein one of the gear planes (IV) is a drive output constant and is couplable to a carrier (PT) of the planetary gearset (GP).

22. The transmission according to claim 21, wherein the drive output constant (IV) is couplable to the carrier (PT) of the planetary gearset (GP) by a further shifting element (J) located between the drive output constant (IV) and the planetary gearset (GP).

23. The transmission according to claim 17, wherein to shift the planetary gearset (GP), two shifting elements (L, H) arranged in a shifting device are provided, which when a further shifting element (J) is arranged on the drive output side (AB), are arranged on the drive input side (AN) of the planetary gearset (GP).

24. The transmission according to claim 14, wherein the transmission is incorporated within one of a passenger vehicle or a truck.

* * * * *